United States Patent Office.

CARL BOCKING, OF BOSTON, MASSACHUSETTS.

Letters Patent No. 109,578, dated November 29, 1870; antedated November 12, 1870.

IMPROVEMENT IN COMPOSITIONS FOR THE MANUFACTURE OF BOOT AND SHOE-HEELS.

The Schedule referred to in these Letters Patent and making part of the same.

*To all whom it may concern:*

Be it known that I, CARL BOCKING, of Boston, in the county of Suffolk and State of Massachusetts, have invented a new and useful Composition for the Manufacture of Heels for Boots, Shoes, and Slippers; and I do hereby declare that the following is a full and exact description thereof.

Take one-fourth pound India rubber, or caoutchouc; one-half pound sulphur; one pound clay; one ounce hemp; one ounce paper; two ounces tar; one pound soapstone. Mix with coal-oil. Heat over fire to a thick paste. Press it in molds, and heat from one and one-half to two hours at 230° to 260° Fahrenheit.

I do not confine myself to the aforesaid proportions of the above-named ingredients.

I claim—

The herein-described composition for the manufacture of boot and shoe-heels.

CARL BOCKING.

Witnesses:
   A. J. McLORD,
   JOSEPH W. REED.